United States Patent
Nakajima et al.

[11] Patent Number: 6,082,981
[45] Date of Patent: Jul. 4, 2000

[54] OIL SEPARATOR FOR COMPRESSOR, SCROLL COMPRESSOR USING SAME, AND METHOD OF MANUFACTURING OIL SEPARATOR FOR COMPRESSOR

[75] Inventors: Hideyuki Nakajima; Hiroshi Kitaura; Yuji Sakata, all of Sakai, Japan

[73] Assignee: Daikin Industries, Ltd., Osaka, Japan

[21] Appl. No.: 09/077,266

[22] PCT Filed: Sep. 24, 1997

[86] PCT No.: PCT/JP97/03370

§ 371 Date: May 27, 1998

§ 102(e) Date: May 27, 1998

[87] PCT Pub. No.: WO98/14705

PCT Pub. Date: Apr. 9, 1998

[30] Foreign Application Priority Data

Sep. 30, 1996 [JP] Japan ................................. 8-280335

[51] Int. Cl.[7] ........................................................ F01C 1/02
[52] U.S. Cl. ........................................ 418/55.6; 418/DIG. 1
[58] Field of Search ............................... 418/55.6, DIG. 1

[56] References Cited

FOREIGN PATENT DOCUMENTS

| 0145483 | 7/1985 | Japan | ................................. 418/55.6 |
| 0126282 | 6/1987 | Japan | ................................. 418/55.6 |
| 0240787 | 9/1989 | Japan | ................................. 418/55.6 |
| 1-240787 | 9/1989 | Japan . | |
| 404153590 | 5/1992 | Japan | ................................. 418/55.6 |
| 406074164 | 3/1994 | Japan | ................................. 418/55.6 |
| 7-293475 | 7/1995 | Japan . | |

*Primary Examiner*—Hoang Nguyen
*Attorney, Agent, or Firm*—Burns, Doane, Swecker & Mathis, LLP

[57] ABSTRACT

An oil separator for a compressor according to the present invention is an oil separator (33) for separating oil flowing into a high-pressure chamber (21a) from a low-pressure chamber (21b) with a compression medium in a compressor from the compression medium, and comprises a demister (33a) which is in the form of a net formed by braiding metal thin wires and has surfaces subjected to sandblasting. Due to this structure, an oil separator for a compressor not reducing oil separability also in case of employing an HFC refrigerant and ether oil in combination with each other is implemented. The demister (33a) is formed by performing sandblasting on both front and rear surfaces of a netted strip (33a) and thereafter annularly winding the strip.

13 Claims, 5 Drawing Sheets

STANDARD WIRE (DIAMETER0.12)
BEFORE SANDBLASTING x 75

STANDARD WIRE
(DIAMETER0.12)
AFTER SANDBLASTING
x 75

OIL SEPARATOR FOR COMPRESSOR, SCROLL COMPRESSOR USING SAME, AND METHOD OF MANUFACTURING OIL SEPARATOR FOR COMPRESSOR

TECHNICAL FIELD

The present invention relates to an oil separator for a compressor and a method of manufacturing the same, and more particularly, it relates to an oil separator for separating oil mixed into a refrigerant which is fed into a high-pressure chamber side in a compressor employed for a refrigerator or the like for returning the same to a low-pressure chamber side and a method of manufacturing the same.

BACKGROUND TECHNIQUE

In a compressor which is employed as an element of a refrigeration cycle for a refrigerator, oil is supplied for the purpose of lubricating a bearing part of a motor driving shaft and a compression element, and this oil is mixed into a refrigerant in the compressor, passes through the compression element with the refrigerant and is discharged into a high-pressure chamber. When the oil thus mixed into the refrigerant is discharged from the compressor and enters the refrigeration cycle, the heat exchange rate reduces in heat exchange in an evaporator forming the refrigeration cycle. Therefore, means for separating the oil entering the high-pressure chamber in the compressor from the refrigerant and returning the same to the low-pressure chamber is adopted. An oil separator for a compressor to which the present invention is directed is provided as one of such means, for the purpose of separating oil entering a high-pressure chamber in the compressor from a refrigerant.

As the prior art showing this type of oil separator for a compressor, a scroll compressor on which an oil separator including a demister is mounted, disclosed in Japanese Patent Laying-Open No. 1-240787, is mentioned. The scroll compressor disclosed in this gazette connects a casing top 3 opening an outer discharge port 2 to an upper end portion of a casing body 1, and press-fits an end plate 5 of a fixed scroll 4 into an opening side end portion of this casing top 3 by shrinkage fitting or the like, for forming a discharge chamber 6 which is divided from the casing body 1 above the end plate 5, as shown in FIG. 6.

A frame 8 is supported for the fixed scroll 4 in opposition to a movable scroll 7, while a motor (not shown) is provided under the frame 8, so that the movable scroll 7 is revolved/driven with respect to the fixed scroll 4 by driving of this motor. Refrigerant gas which is inhaled from a low-pressure chamber 10 is compressed between the fixed-movable scrolls 4 and 7 by this revolution/driving of the movable scroll 7, so that this compressed refrigerant gas is discharged from a discharge hole 11 provided on a central portion of the fixed scroll 4 into the discharge chamber 6, and discharged into a discharge pipe 12 through the outer discharge port 2.

An oil separator 13 is mounted on the upper surface of the fixed scroll 4 of this scroll compressor, so that the oil which is discharged into the discharge chamber 6 with the refrigerant gas is separated from the refrigerant gas by this oil separator 13. The separated oil is returned to the bottom side of the casing body 1 through an oil return tube 14 extending in the vertical direction through the fixed scroll 4 and the frame 8. A concave part 15 is formed around the discharge chamber 6 side end portion of the oil return tube 14, for collecting the oil separated from the refrigerant gas in this concave part 15 and precipitating dust out of the oil.

The oil separator 13 is formed by a netted demister 13a which is annularly formed by winding a metal thin wire of stainless steel or the like or a woven strip of a plurality of stranded metal thin wires a prescribed number of times, and a plate-type fitting 13b which is integrated with the demister 13a to cover a part of its periphery and its upper surface.

As lubricating oil for a compressor for a refrigerator, SUNISO 4GS based on mineral oil has been mainly employed since its affinity with a flon-based R22 refrigerant generally employed as a refrigerant for a refrigerator is excellent. This SUNISO 4GS is the so-called nonpolar oil, which has no polarity since no oxygen group is provided in its molecular structure. The nonpolar oil hardly forms monomolecular films on the surfaces of the demister 13a of the oil separator 13, and hence the wettability of the oil with respect to the oil separator 13 is not damaged and the oil capturability by the oil separator 13 is excellently maintained.

In recent years, however, destruction of the ozone layer with the flon-based refrigerant comes into question, and there is a tendency to replace the refrigerant with R407C, which is an HFC (Hydro-Fluoro-Carbon) refrigerant destructing no ozone layer since it contains no chlorine, in response to the international trend of regulating employment of the flon-based refrigerant. As lubricating oil in case of employing this HFC refrigerant, ester or ether oil which is chemosynthetic oil having excellent affinity with the HFC refrigerant is employed. In such lubricating oil, ester or ether oil has polarity since the same has an oxygen group in its molecular structure. Such polar oil readily forms monomolecular films on the surfaces of the demister 13a of the oil separator 13, and once monomolecular films are formed on the surfaces of the demister 13a, the wettability of the oil with respect to the oil separator 13 thereafter deteriorates. In other words, the surfaces of the demister 13a provided with the monomolecular film readily repel the oil, and hence the oil is hardly captured by the oil separator 13 and readily re-scattered. Consequently, the oil discharged into a high-pressure chamber is not separated from the refrigerant but enters the refrigeration cycle to reduce the heat exchange rate in an evaporator or the like, and hence the refrigeration efficiency is disadvantageously reduced.

DISCLOSURE OF THE INVENTION

In order to solve the aforementioned problem of the prior art, the present invention is aimed at obtaining an oil separator for a compressor, whose oil separability is not reduced also when employing an HFC refrigerant and oil having polarity (e.g., ether oil) in combination with each other.

The inventive oil separator for a compressor according to claim 1 attaining the aforementioned object is an oil separator 33 for separating oil flowing into a high-pressure chamber 21a from a low-pressure chamber 21b with a compression medium in a compressor from the compression medium, which comprises a netted body part 33a formed by braiding metal thin wires, and uneven parts for improving oil capturability are formed on the surfaces of the metal thin wires forming the netted body part 33a.

According to this structure, uneven parts are formed on the surfaces of the said metal thin wires forming the netted body part 33a, whereby the surface area of the netted body part 33a increases and penetration of the oil into the uneven parts takes place, and hence the oil capture efficiency of the oil separator is increased and the oil separability improves as a result.

As means for forming the uneven parts on the surfaces of the metal thin wires of the netted body part 33a of the inventive oil separator for a compressor, sandblasting is preferably applied, as described in claim 2.

Thus, the surfaces of the netted body part are treated by sandblasting, whereby the oil capture efficiency of the oil separator increases and the oil separability can be improved. As the reasons for having action of increasing the oil capture efficiency by treating the surfaces of the netted body part by sandblasting, the following four items can be mainly mentioned:

(1) Uneven parts are formed on the surfaces of the netted body part, whereby the surface area increases.

(2) Small cracks are formed on the surfaces of the netted body part, thereby causing penetration of the oil.

(3) A number of lattice defects such as slip steps, rearranged ends and lattice distortion are caused on the surfaces of the netted body part, whereby the same act as energetically instable and chemical active sites, for changing the metal surfaces forming the netted body part to surfaces which are rich in reactivity.

(4) Due to action based on an exoelectron phenomenon (Kramer's effect). The exoelectron phenomenon indicates such a phenomenon that temporary electron emission occurs from metal surfaces immediately after machining such as blasting, which can take place under the room temperature. The emitted exoelectrons have energy of about 1 eV, and have catalytic action with respect to a certain type of surface reaction (these reasons (1) to (4) are described in page 222 to page 223 of "Kinzokubussei Kiso Koza, Vol. 10, Kaimenbussei" issued by Maruzen Co., Ltd. on Jun. 25, 1976).

In a preferred embodiment of the inventive oil separator for a compressor, the netted body part 33a includes an annular body 33a formed by winding a netted strip 33c which is formed by braiding metal thin wires once or a plurality of times, and a surface treatment for forming uneven parts for increasing the oil capturability is performed on both front and rear surfaces of the netted strip 33c forming the annular body 33a, as described in claim 3.

Thus, uneven parts are formed on both front and rear surfaces of the netted strip forming the annularly wound netted body part 33a, whereby the oil comes into contact with the surfaces of the netted body part 33a a plurality of times at the time of passing through the oil separator, and hence the degree of capturing the oil increases in response to the number of times, and excellent oil separability can be attained.

A scroll compressor according to the present invention is a scroll compressor formed by arranging a fixed scroll 22 provided with a spiral body 22b on the lower surface of a substrate 22 and a movable scroll 23 provided with a spiral body 23b on the lower surface of a substrate 23a to be vertically opposed to each other for combining the spiral bodies 22b and 23b with each other and forming a compression chamber in a closed housing 21 and opening a discharge hole 22c at a central portion of the substrate 22a of the fixed scroll 22 for forming a high-pressure chamber 21a above the fixed scroll 22, the high-pressure chamber 21a is provided therein with an oil separator 33 for separating oil flowing into the high-pressure chamber 21a from the discharge hole 22c of the fixed scroll 22 from a compression medium, the oil separator 33 comprises a netted body part 33a formed by braiding metal thin wires, and uneven parts for increasing oil capturability are provided on the surfaces of the metal thin wires forming the netted body part 33a, as described in claim 4.

According to the inventive scroll compressor having such a structure, the amount of mixing of the oil into a refrigerant discharged into a refrigeration cycle can be reduced since the oil capture efficiency in the oil separator 33 increases and the oil separability improves when employed as a compressor for the refrigeration cycle, whereby the refrigeration efficiency improves.

In a preferred embodiment of the inventive scroll compressor, the upper surface of the fixed scroll 22 is arranged to divide the high-pressure chamber 21a and the low-pressure chamber 21b from each other, a partition member 30 having a discharge opening 30a communicating with the discharge hole 22c of the fixed scroll 22 and opening in the high-pressure chamber 21a is provided, and the oil separator 33 is so mounted on the upper surface of the partition member 30 that its netted body part 33a encloses the periphery of the discharge opening 30a, as described in claim 5.

A method of manufacturing an oil separator for a compressor according to the present invention comprises a step of forming a netted body 33c by braiding a single metal thin wire or a plurality of stranded metal thin wires, a step of performing a surface treatment for forming uneven parts on both front and rear surfaces of the netted body 33c, and a step of performing prescribed working on the surface-treated netted body 33c for forming a netted body part 33a of an oil separator 33, as described in claim 6.

According to this manufacturing method, the inventive oil separator for a compressor having the structure described in claim 3 can be readily formed without damaging mass producibility, and increase of the production cost can be suppressed to the minimum.

Preferably, the aforementioned step of performing the surface treatment includes a step of performing sandblasting on both front and rear surfaces of the netted body 33c, as described in claim 7.

In a preferred embodiment of the inventive method of manufacturing an oil separator for a compressor, glass beads of not more than 200 $\mu$m in grain size and at least 500 Hv in hardness are employed as sand in the step of performing sandblasting, as described in claim 8.

In another preferred embodiment of the inventive method of manufacturing an oil separator for a compressor, further, the step of forming the netted body 33c includes a step of forming a netted strip 33c, and the step of forming the netted body part 33a includes a step of forming an annular body 33a by winding the netted strip 33c subjected to the surface treatment once or a plurality of times, as described in claim 9.

BEST MODES FOR CARRYING OUT THE INVENTION

An embodiment of the present invention is now described with reference to the drawings. The present invention is directed to an oil separator for a compressor, which is not directly influenced by the structure of the compressor itself, but a scroll compressor having a structure slightly different from that described with reference to the aforementioned prior art was employed in the following evaluation test in each Example of the present invention, and hence an outline of the scroll compressor which carries the oil separator for a compressor according to this embodiment and was employed for the evaluation test is now described with reference to FIG. 1.

Figure 1:
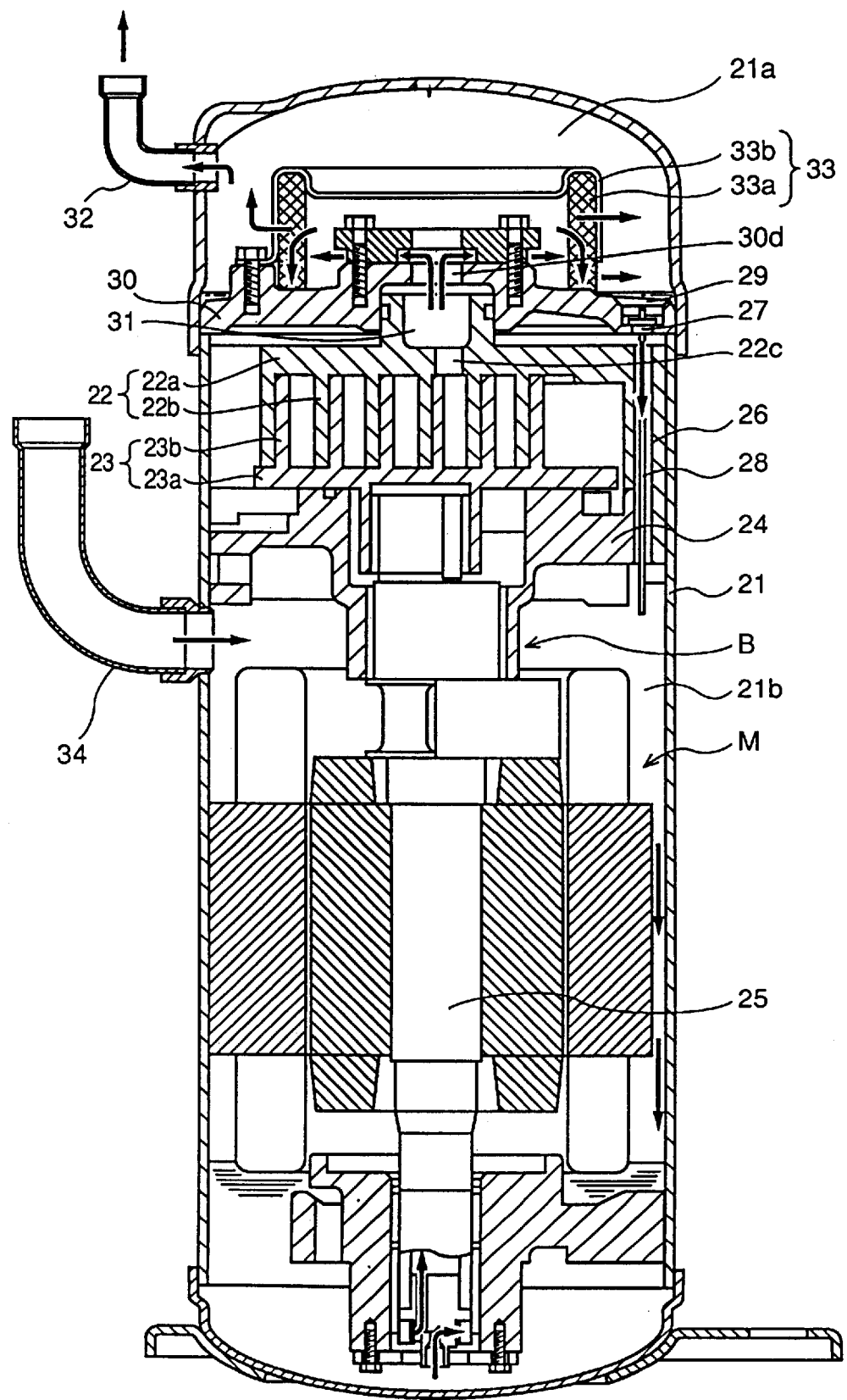
FIG. 1 is a sectional view showing a longitudinal section of a scroll compressor of a type employed for a performance evaluation test of the inventive oil separator for a compressor.

The scroll compressor shown in FIG. 1 has a structure obtained by loading an oil separator serving as an oil separator on the scroll compressor disclosed in Japanese Patent Laying-Open No. 4-241702, for example. This scroll compressor comprises a fixed scroll 22 and a movable scroll 23 serving as a compression part on an upper portion in a closed casing 21. The fixed scroll 22 consists of a fixed substrate 22a and a spiral body 22b provided on its lower surface, and fixed to a frame 24 so that this spiral body 22b is directed downward. The movable scroll 23 consists of a movable substrate 23a and a spiral body 23b provided on its upper surface, and so arranged that this spiral body 23b is opposed to the spiral body 22b of the fixed scroll 22. A bearing B is provided on the frame 24, to support a driving shaft 25. The upper portion of this driving shaft 25 is connected to the movable scroll 23, and the lower portion is connected to a motor M.

A partition member 30 is provided above the fixed scroll 22, and a high-pressure chamber 21a and a low-pressure chamber 21b are formed above and under the partition member 30 respectively. In other words, the partition member 30 serves as a divisional member dividing the interior of the casing 21 into the high-pressure chamber 21a and the low-pressure chamber 21b. A suction pipe 34 for introducing a refrigerant which is condensed in a condenser (not shown) to a low-temperature/low-pressure state is connected to the low-pressure chamber 21b. The refrigerant which is compressed in the compression part is discharged into the high-pressure chamber 21a through a discharge hole 22c and a concave opening 31 provided substantially at the center of the fixed substrate 22a of the fixed scroll 22 and a discharge opening 30a provided substantially at the center of the partition member 30. A discharge pipe 32 for feeding the refrigerant which is compressed to a high-temperature/high-pressure state into an evaporator (not shown) is connected to the high-pressure chamber 21a.

A through hole 26 of a relatively large diameter is formed in the fixed scroll 22 and the frame 24. A capillary tube 28 of a small diameter is inserted in the through hole 26, and a portion close to its upper end is supported for the fixed scroll 22 by a bush 27. The lower end of the capillary tube 28 reaches a portion close to the motor M.

Figure 2:
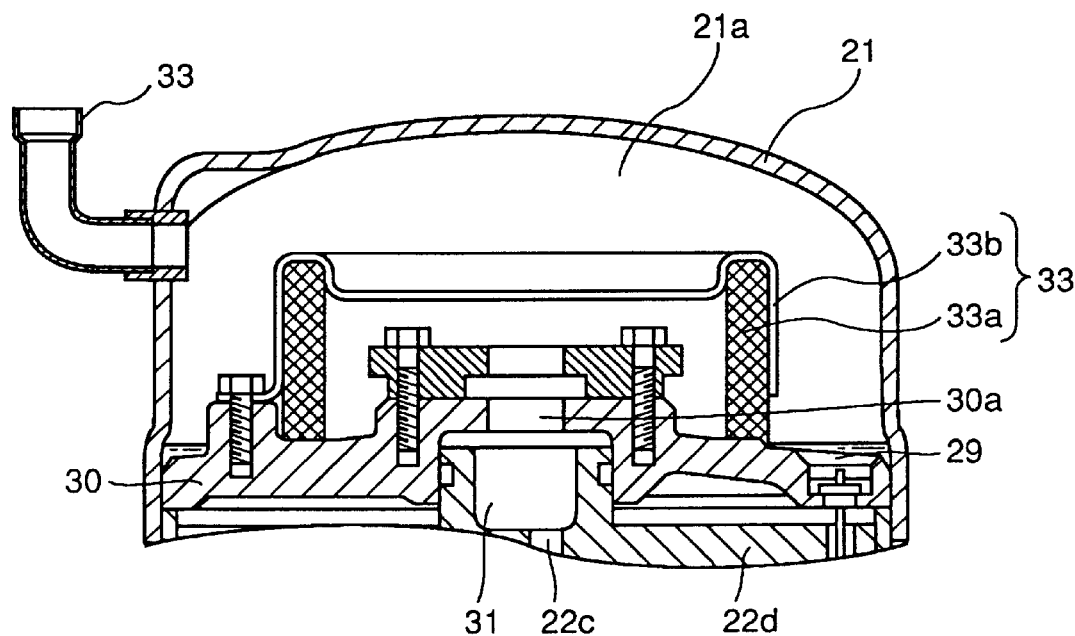
FIG. 2 is a partially fragmented longitudinal sectional view showing the proximity of an oil separator provided on the scroll compressor of FIG. 1 in an enlarged manner.
Figure 3:
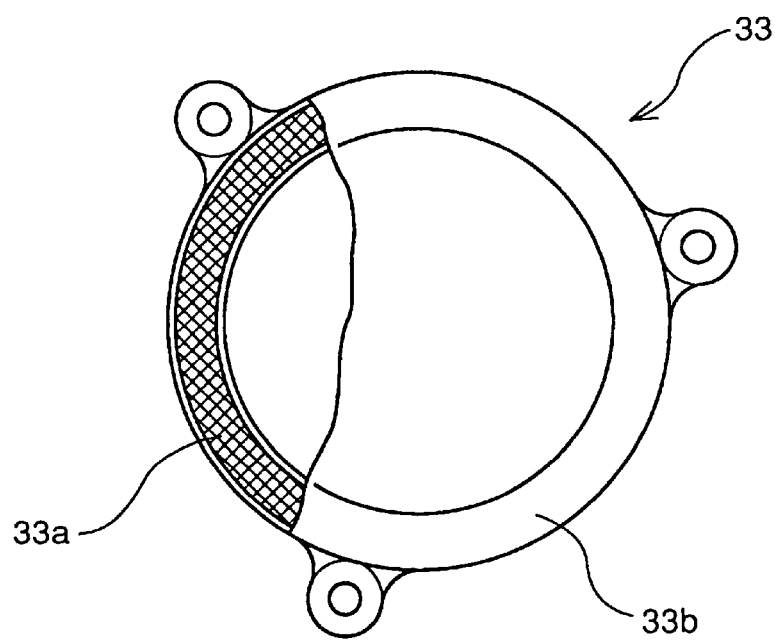
FIG. 3 is a partially fragmented plan view of the oil separator shown in FIG. 2.

An oil separator 33 is mounted on the upper surface of the partition member 30 of this scroll compressor, and oil discharged into the high-pressure chamber 21a with refrigerator gas is separated from the refrigerator gas by this oil separator 33. As shown in FIGS. 2 and 3 in an enlarged manner, the oil separator 33 is common with the oil separator 13 in the aforementioned prior art in a point that the same is formed by a demister 33a serving as a netty body part which is annularly formed by winding a metal thin wire of stainless steel or the like or a woven strip of a plurality of stranded metal thin wires a prescribed number of times and a plate-type fitting 33b which is integrated with the demister 33a to cover a part of its periphery and its upper surface, while the oil separator 33 according to this embodiment is characterized in that the surfaces of the strip net forming the demister 33a are treated by sandblasting, as described later.

The operation of the scroll compressor having the aforementioned structure is now described. First, the driving shaft 25 rotates by driving of the motor M, and the movable scroll 23 is revolved/driven with respect to the fixed scroll 22. The refrigerant of a low-temperature/low-pressure state introduced into the low-pressure chamber 21b from the suction pipe is introduced into a space enclosed with the fixed scroll 22 and the movable scroll 23. The introduced refrigerant is compressed by the revolution/driving of the movable scroll 23, and discharged into the high-pressure chamber 21a through discharge hole 22c, concave opening 31 and discharge opening 30a. The refrigerant which is brought into a high-temperature/high-pressure state thereafter flows into the discharge pipe 32. Referring to FIG. 1, thick arrows show the directions of flow of the refrigerant and the oil.

Noting the flow of the oil, the oil entering the high-pressure chamber 21a with the refrigerant is first separated from the refrigerant by the oil separator 33 and collected in a concave portion 29 provided in the partition member 30, and thereafter returned to the low-pressure chamber 21b through the capillary tube 28.

Figure 4A:
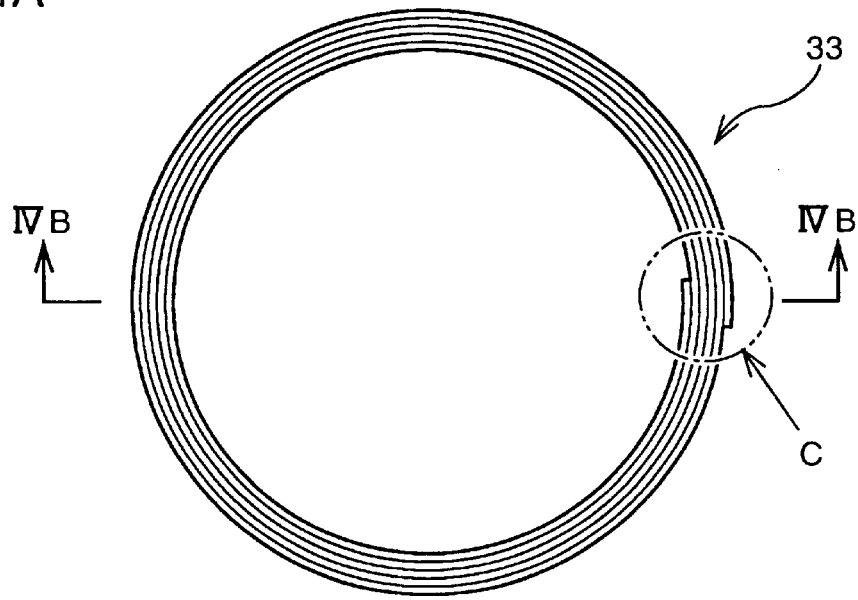
FIG. 4A is a plan view showing an exemplary structure of a demister of the oil separator shown in FIGS. 1 and 2.
Figure 4B:
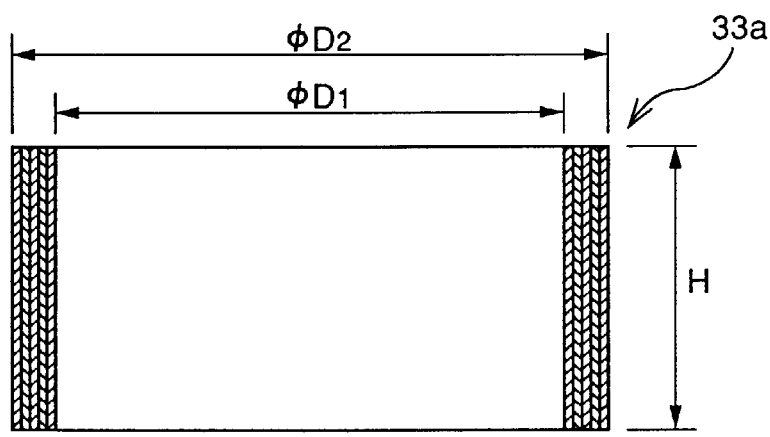
FIG. 4B is a sectional view taken along the line IVB—IVB in FIG. 4A.
Figure 4C:
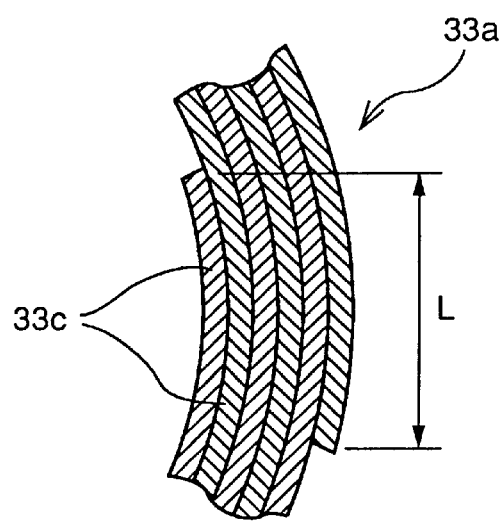
FIG. 4C is a partially enlarged view showing a portion enclosed with a circle C in FIG. 4A in an enlarged manner.

As hereinabove described, this embodiment employs the oil separator 33 comprising the demister 33a subjected to a surface treatment by sandblasting, thereby increasing the oil capture efficiency and improving the oil separation efficiency as compared with the conventional oil separator. A method of manufacturing this demister 33a is now described with reference to a demister having a plural number of turns as shown in FIGS. 4A to 4C.

First, five stainless steel (e.g., SUS304) thin wires of about 0.12 mm in diameter serving as standard wires are stranded, and the same are braided thereby forming a netted strip 33c having a prescribed length and a prescribed width. Thereafter this netted strip is degreased/cleaned, and then sandblasting is performed on both front and rear surfaces. In this sandblasting, glass beads of not more than 200 µm in grain size and 500 to 550 Hv in hardness are employed as sand. In the concrete, it is possible to employ "Blasting Beads" by Toshiba Corporation having sand components shown in the following Table 1 with grain sizes of 150 to 200 µm. As preferable blast conditions in the sandblasting, a shot pressure of 6 kg/cm$^2$, a shot time of 1 to 2 seconds and a shot distance of about 100 mm are preferable.

Figure 5A:
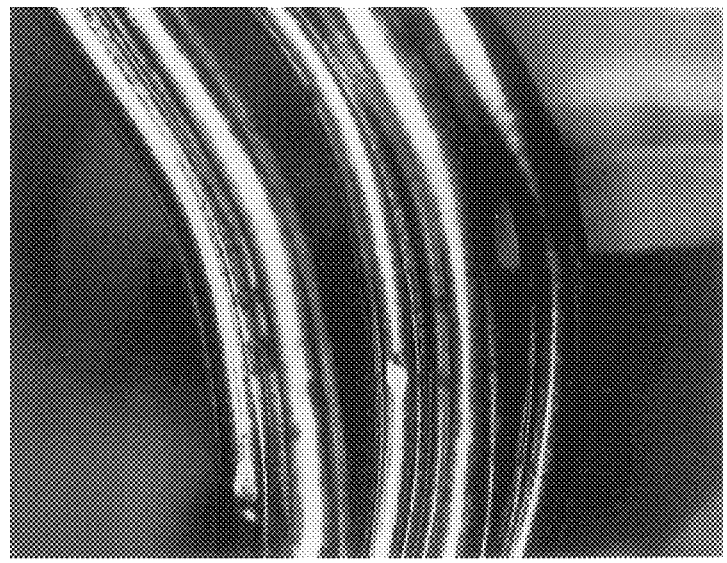
FIG. 5A is a microphotograph showing standard wires (not sandblasted) forming a demister of an oil separator employed in an evaluation test in each Example of an embodiment of the present invention in enlargement by 75 magnifications.
Figure 5B:
FIG. 5B is a microphotograph showing a state after performing sandblasting on the surfaces of the standard wires of FIG. 5A in enlargement by 75 magnifications showing the part in enlargement.
Figure 6:
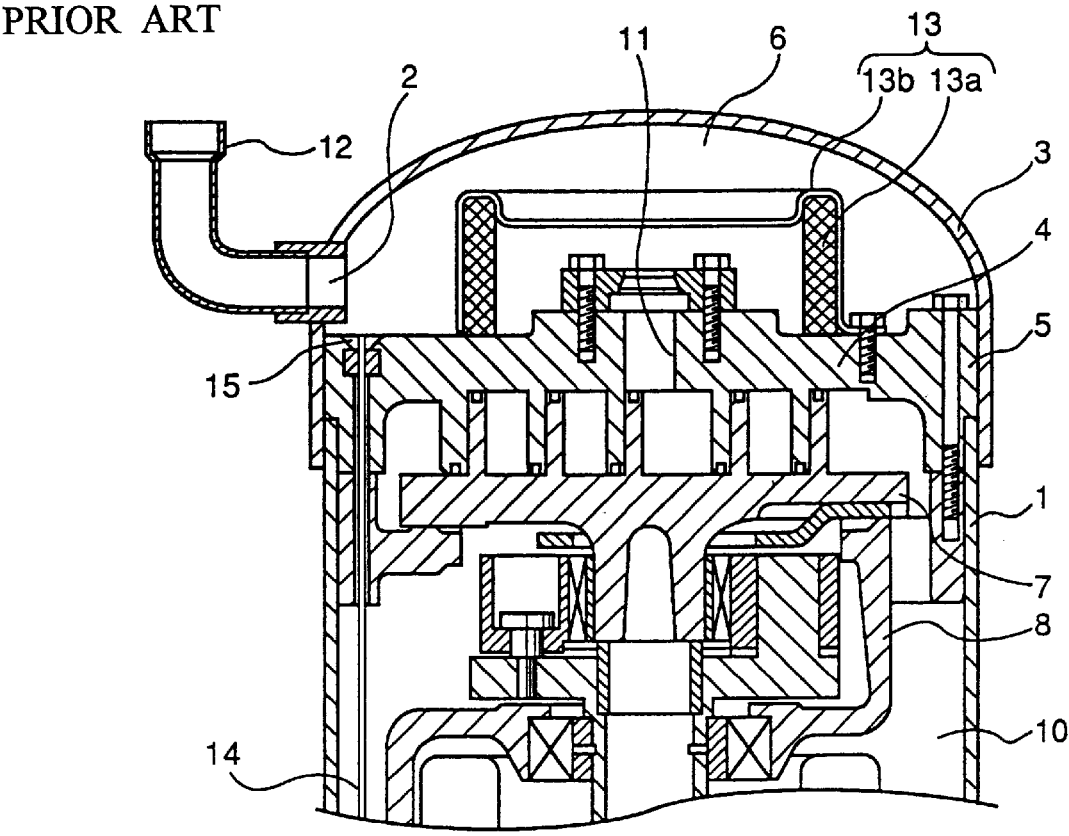
FIG. 6 is a partially fragmented longitudinal sectional view showing the structure of a conventional scroll compressor provided with an oil separator.
Figure 7:
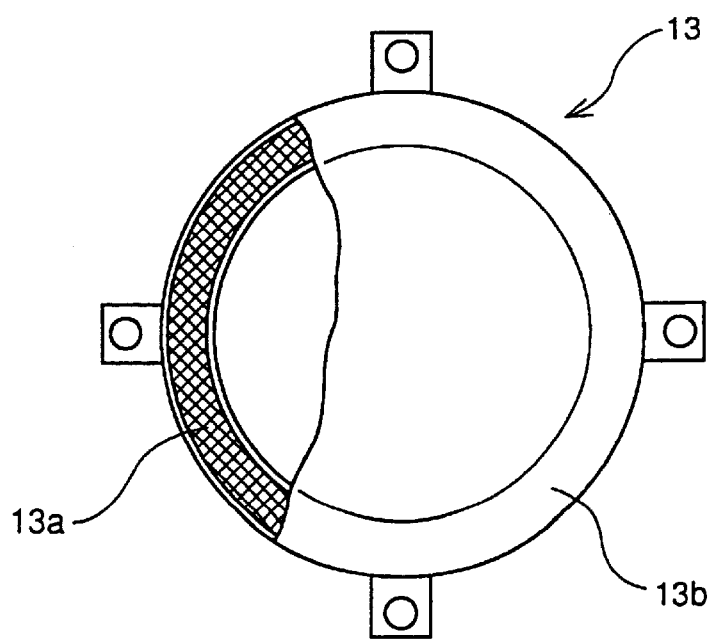
FIG. 7 is a partially fragmented plan view of the oil separator provided on the conventional scroll compressor shown in FIG. 6.

FIG. 5A shows a microphotograph enlarging standard wires (not sandblasted) forming a demister of an oil separator employed for an evaluation test in each of the following Examples by 75 magnifications. FIG. 5B shows a microphotograph enlarging a state after performing sandblasting on the surfaces of the standard wires in FIG. 5A by 75 magnifications.

TABLE 1

[Sand Components of Blasting Beads by Toshiba Corporation]

| Component | wt. % | Component | wt. % |
|---|---|---|---|
| $SiO_2$ | 72.0 | $Al_2O_3$ | 1.3 |
| $Na_2O$ | 14.3 | $K_2$ | 0.3 |
| CaO | 8.2 | $SO_3$ | 0.3 |
| MgO | 3.5 | Others | 0.1 |

Then, the sandblasted netted strip 33c is wound and interconnected by spot welding, whereby an annular demister 33a having a prescribed inner diameter $D_1$, an outer diameter $D_2$ and a height H is completed as shown in FIGS. 4A to 4C, for example. A length L shown in FIG. 4C expresses a winding margin. FIGS. 4A to 4C show the case where the number of turns is 5 and this number of turns is properly increased/decreased at need, while it can be said that the degree of separating the oil from the refrigerant increases as the number of turns increases in general, since the number of times at which the passing mixture of the refrigerant and the oil comes into contact with the surfaces of the demister increases. As hereinabove described, it is possible to attain an effect by sandblasting on all surfaces through and with which the mixture of the refrigerant and the oil passes and comes into contact by performing sandblasting on both surfaces of the netted strip 33c and thereafter winding the strip as compared with the case of performing sandblasting after winding, and the oil separation efficiency can be improved to the maximum.

Various Examples verifying the effect by employment of the oil separator 33 subjected to the surface treatment by sandblasting are described with results of evaluation tests thereof.

EXAMPLE 1

First, an oil separability comparison test was made as Example 1, as to five types of demister samples shown in the following Table 2, with employment of R407C/ether oil as a combination of refrigerant/oil. Among the demister samples Nos. 1 to 5 shown in Table 2, No. 1 is in a base specification consisting of wires subjected to no surface treatment, No. 2 is an inventive sample subjected to sandblasting, and Nos. 3 to 5 are comparative samples subjected to surface treatments other than sandblasting. Referring to respective Tables, demister samples provided with * marks on the left or upper sides of the sample Nos. correspond to inventive samples, while all remaining ones are comparative samples which are out of the scope of the present invention.

Results of the evaluation test are as shown in Table 2. Referring to Table 2, the oil rise rate means the weight percentage of oil in such a state that a mixture of refrigerant/oil flowing into a refrigeration cycle liquefies in a condenser, and the oil separation efficiency means the oil capture efficiency by a demister, i.e., $(w_1-w_2)/w_1 \times 100$ wt. %, assuming that $w_1$ represents the weight of oil flowing out in a state mixed with a refrigerant when no demister is provided, and $w_2$ represents the weight of oil flowing out in a state mixed with a refrigerant when a demister is provided.

TABLE 2

[Result of Oil Separability Comparison Test by Demister Specification]
Test Conditions refrigerant/oil: R407C/ether oil
refrigerant temperature: 55° C. on high-temperature side, 5° C. on low-temperature side
rotational frequency: 7500 rpm

| Sample No. | Specification | | Oil Rise Rate (wt %) | Oil Rise Increase/Decrease Ratio to Base Specification (%) | Oil Separation Efficiency (%) | Manufacturability | Evaluation |
|---|---|---|---|---|---|---|---|
| 1 | Base | height H: 50, number of turns: 7, outer diameter: 103, inner diameter: 86 | 1.5 | — | 80 | ○ | — |
| *2 | Surface Treatment | sandblasting | 0.5 | −67 | 93 | ○ | ⊙ |
| 3 | | surface fluorine coating | 1.0 | −33 | 87 | Δ | Δ |
| 4 | | heat treatment (380° C. 30 min.) | 2.0 | +33 | 73 | ○ | X |
| 5 | | demister winding space increase | 1.3 | −13 | 83 | ○ | Δ | note 1)
*mark inventive sample, others comparative samples.
note 2)
oil rise rate . . . weight percentage of oil in refrigerant/oil mixture liquefied in condenser
note 3)
oil separation efficiency . . . oil capture efficiency by demister As understood from the test results shown in Table 2, remarkable reduction of the oil rise rate and remarkable increase of the oil separation efficiency are implemented in case of employing the demister of the sample No. 2 which is the inventive sample, as compared with the case of employing the remaining demister samples of the base specification or subjected to treatments other than sandblasting on the surfaces. Further, the sandblasting is excellent in manufacturability as compared with other surface treatments, and will not remarkably increase the manufacturing cost.

EXAMPLE 2

Then, an evaluation test was carried out by rendering refrigerant/oil and other test conditions similar to the aforementioned case of Example 1 and employing demister samples Nos. 6 to 8 as Example 2, for the purpose of analyzing the effect of oil separation efficiency improvement by sandblasting in detail. Results thereof are shown in Table 3.

TABLE 3

[Evaluation Test Result (1) of Sandblasted Demister]
Test Conditions refrigerant/oil: R407C/ether oil
refrigerant temperature: 55° C. on high-temperature side, 5° C. on low-temperature side
rotational frequency: 7500 rpm

| Sample No. | Specification | Change of Oil Rise Rate (wt %) | Oil Rise Increase/Decrease Ratio to Base Specification (%) | Oil Separation Efficiency (%) | Manufacturability | Evaluation |
|---|---|---|---|---|---|---|
| *6 | sandblasted (sand material: alumina) height H: 50, number of turns: 7 5 stranded wires outer diameter: 103, inner diameter: 86, 119 g | 1.5→0.5 | −67 | 93 | — | |
| *7-1 | sandblasted (sand material: glass beads) height H: 50, number of turns: 7 5 stranded wires outer diameter: 103, inner diameter: 86, 119 g | 2.6→0.5 | −81 | 93 | ○ | ⊚ |
| *7-2 | | 2.0→0.4 | −80 | 94 | | |
| 8 | not sandblasted press-formed product height H: 52, number of turns: 7 1 stranded wire outer diameter: 103, inner diameter: 86, 119 g | 1.5→0.9 | −40 | 88 | ○ | ○ | note 1)
*marks inventive samples, the rest comparative sample.
note 2)
oil rise . . . weight percentage of oil in refrigerant/oil mixture liquefied in condenser (e.g., "1.5→0.5" means that an oil rise rate which had been 1.5 wt. % in the base specification became 0.5 wt. % in the demister)
note 3)
oil separation efficiency . . . oil capture efficiency by demister As described on the column of "specification" in Table 3, the sample No. 6 and the samples Nos. 7-1 and 7-2 are inventive samples subjected to sandblasting, while the sample No. 8 is a comparative sample subjected to no sandblasting but press-formed. As understood from the evaluation test results shown in Table 3, the oil separation efficiency increases in case of employing the inventive samples subjected to sandblasting, as compared with the case of employing the comparative sample (sample No. 8) subjected to no sandblasting.

EXAMPLE 3

Then, an evaluation test was carried out by changing the capacity of a compressor serving as a base and employing demister samples No. 9 (inventive sample) and Nos. 10-1 and 10-2 (comparative samples) shown in Table 4 as Example 3, for a purpose similar to the aforementioned Example 2. Following the change of the capacity of the compressor, the sizes of the demisters carried thereon are also changed in this case. Also from the test results shown in Table 4, it is understood that the oil rise rate remarkably reduces in case of employing the demister of the sample No. 9 which is the inventive sample as compared with the comparative samples.

TABLE 4

[Evaluation Test Result (2) of Sandblasted Demister]
Test Conditions
refrigerant/oil: R407C/ether oil
refrigerant temperature: 55° C. on high-temperature side,
5° C. on low-temperature side
rotational frequency: 3600 rpm

| Sample No. | Specification | Change of Oil Rise Rate (wt %) | Oil Rise Increase/ Decrease Ratio to Base Specification (%) |
|---|---|---|---|
| *9 | sandblasted height H: 42, number of turns: 7 5 stranded wires outer diameter: 113, inner diameter: 96, 104 g | 1.3 → 0.24 | −82 |
| 10-1 | not sandblasted press-formed product height H: 42 | 1.3 → 0.6 | −51 |
| 10-2 | 1 stranded wire outer diameter: 113, inner diameter: 96, 103 g | 1.5 → 0.4 | −73 | note 1) *mark inventive sample, others comparative samples.
note 2) oil rise rate . . . weight percentage of oil in refrigerant/oil mixture liquefied in condenser (e.g., "1.3 → 0.24" means that an oil rise rate which had been 1.3 wt. % in the base specification became 0.24 wt. % in the demister)

EXAMPLE 4

Then, an evaluation test was carried out by employing demister samples No. 11 (inventive sample) and No. 12

(comparative sample) shown in Table 5 as Example 4, for a purpose similar to the aforementioned Examples 2 and 3. Also from the test results shown in Table 5, it is understood that the oil rise rate remarkably reduces in case of employing the demister of the sample No. 11 which is the inventive sample as compared with the comparative sample.

TABLE 5

[Evaluation Test Result (3) of Sandblasted Demister]
Test Conditions
refrigerant/oil: R407C/ether oil
refrigerant temperature: 55° C. on high-temperature side,
5° C. on low-temperature side
rotational frequency: 3600 rpm

| Sample No. | Specification | Change of Oil Rise Rate (wt %) | Oil Rise Increase/ Decrease Ratio to Base Specification (%) |
|---|---|---|---|
| 11 | sandblasted height H: 42, number of turns: 7 5 stranded wires outer diameter: 129, inner diameter: 112, 120 g | 1.4 → 0.4 | −71 |
| 12 | not sandblasted press-formed product height H: 42 1 stranded wire outer diameter: 129, inner diameter: 112, 118 g | 1.4 → 0.8 | −43 | note 1) *mark inventive sample, the other comparative sample.
note 2) oil rise rate . . . weight percentage of oil in refrigerant/oil mixture liquefied in condenser (e.g., "1.4 → 0.4" indicates that an oil rise rate which had been 1.4 wt. % in the base specification became 0.4 wt. % in the demister)

EXAMPLE 5

Then, a test of evaluating oil separability as to two types of R22/SUNISO 4GS and R407C/ether oil as combinations of refrigerant/oil was carried out as Example 5 under test conditions shown in Table 6. As demisters directed to a test for comparison, a sample No. 13 (comparative sample) of the base specification with no surface treatment, a sample No. 14 (inventive sample) subjected to sandblasting, and a sample No. 15 (comparative sample) subjected to no sandblasting but press-formed described on the column of the specification in Table 6 were employed.

TABLE 6

[Result of Oil Separability Comparison Test by Two Types of Refrigerant/Oil]
Test Conditions refrigerant temperature: 55° C. on high-temperature side, 5° C. on low-temperature side
rotational frequency: 7500 rpm

| | Refrigerant/Oil | R22/SUNISO 4GS | | | R407C/ether oil | | |
|---|---|---|---|---|---|---|---|
| Sample No. | Specification | Oil Rise Rate (wt %) | Oil Rise Increase/Decrease Ratio to Base Specification (%) | Oil Separation Efficiency (%) | Oil Rise Rate (wt %) | Oil Rise Increase/Decrease Ratio to Base Specification (%) | Oil Separation Efficiency (%) |
| 13 | Base height H: 50, number of turns: 7 outer diameter: 103, inner diameter: 85, 119 g | 0.8 | — | 92 | 1.5 | — | 80 |
| *14 | sandblasted height H: 50, number of turns: 7, 7 stranded wires outer diameter: 103, inner diameter: 86, 119 g | 0.3 | −63 | 97 | 0.4 | −73 | 95 |
| 15 | not sandblasted height H: 52, 1 stranded wire press-formed product outer diameter: 129, inner diamter 86, 119 g | 0.6 | −25 | 94 | 0.9 | −40 | 88 | note 1)
*mark inventive sample, others comparative samples.
note 2)
oil rise . . . weight percentage of oil in refrigerant/oil mixture liquefied in condenser
note 3)
oil separation efficiency . . . oil capture efficiency by demister From the test results of Table 6, it is understood that excellent oil separability can be attained in either one of the two types of refrigerant/oil combinations. Namely, the inventive sample subjected to sandblasting also has such an advantage that the same is applicable to the two types of refrigerants/oil combinations in common, and the effect is particularly eminent when an oil having polarity is used (see to the data of R407C/ether oil in Table 6).

While sandblasting has been employed as the surface treatment means for forming uneven parts on the surfaces of the metal thin wires forming the netted strip 33c of the demister in the aforementioned each embodiment, it is needless to say that employment of another treatment means by which concave parts increasing the oil capture efficiency are formed on the surfaces of the metal thin wires is possible.

Further, the aforementioned embodiment disclosed this time is a mere illustration, the scope of the present invention is shown by the scope of claim for patent, and it is intended that all inner changes are included in supremacy equal to the description of the scope of claim for patent.

What is claimed is:

1. An oil separator for a compressor for separating oil flowing into a high-pressure chamber from a low-pressure chamber with a compression medium in a compressor from the compression medium, comprising a netted body part being formed by braiding a metal thin wire, said netted body part including uneven parts for increasing oil capturability which are formed on the surfaces of said metal thin wire forming said netted body part.

2. The oil separator for a compressor in accordance with claim 1, wherein the uneven parts on the surfaces of said metal thin wire forming said netted body part are formed by sandblasting.

3. The oil separator for a compressor in accordance with claim 1, wherein said netted body part includes an annular body being formed by winding a netted strip formed by braiding the metal thin wire once or a plurality of times, and a surface treatment for forming the uneven parts for increasing oil capturability is performed on both front and rear surfaces of said netted strip forming said annular body.

4. A scroll compressor being formed by arranging a fixed scroll provided with a spiral body on the lower surface of a substrate and a movable scroll provided with a spiral body on the lower surface of a substrate to be vertically opposed to each other for combining said spiral bodies with each other and forming a compression chamber in a closed housing and opening a discharge hole at a central portion of said substrate of said fixed scroll for forming a high-pressure chamber above said fixed scroll, wherein said high-pressure chamber is provided therein with an oil separator for separating oil flowing into said high-pressure chamber from the discharge hole of said fixed scroll from a compression medium, and said oil separator comprises a netted body part formed by braiding a metal thin wire, said netted body part having uneven parts for increasing oil capturability on the surfaces of said metal thin wire forming said netted body part.

5. The scroll compressor in accordance with claim 4, wherein a partition member being arranged to division said high-pressure chamber and the low-pressure chamber from each other and having a discharge opening communicating with said discharge hole of said fixed scroll and opening in said high-pressure chamber is provided on the upper surface of said fixed scroll, and said oil separator is mounted on the upper surface of said partition member so that said netted body part thereof encloses the periphery of said discharge opening.

6. A method of manufacturing an oil separator for a compressor, comprising:

forming a netted body by braiding a metal thin wire or a plurality of stranded metal thin wires;

performing a surface treatment for forming uneven parts on both front and rear surfaces of said netted body; and performing prescribed working on said netted body being subjected to said surface treatment, for forming a netted body part of an oil separator.

7. The method of manufacturing an oil separator for a compressor in accordance with claim 6, wherein said step of performing said surface treatment includes a step of performing sandblasting on both front and rear surfaces of said netted body.

8. The method of manufacturing an oil separator for a compressor in accordance with claim 7, wherein glass beads of not more than 200 µm in grain size and at least 500 Hv in hardness are employed as sand in said step of performing said sandblasting.

9. The method of manufacturing an oil separator for a compressor in accordance with claim 7, wherein said step of forming said netted body includes a step of forming a netted strip, and said step of forming said netted body part includes a step of forming an annular body by winding said netted strip being subjected to said surface treatment once or a plurality of times.

10. The oil separator for a compressor in accordance with claim 1, wherein small cracks are formed on surfaces of said netted body parts, thereby causing penetration of the oil.

11. The oil separator for a compressor in accordance with claim 1, wherein a number of lattice defects are formed on surfaces of said netted body parts.

12. The oil separator for a compressor in accordance with claim 4, wherein small cracks are formed on surfaces of said netted body parts, thereby causing penetration of the oil.

13. The oil separator for a compressor in accordance with claim 4, wherein a number of lattice defects are formed on surfaces of said netted body parts.

* * * * *